(12) United States Patent
Spink et al.

(10) Patent No.: US 8,581,855 B2
(45) Date of Patent: Nov. 12, 2013

(54) JOGBOX FOR A COORDINATE MEASURING MACHINE

(75) Inventors: Stanley Spink, North Kingstown, RI (US); Mark Thomsen, Rehoboth, MA (US); Jerry Tumbush, Dayton, OH (US); Jonathan Dove, Woodstock, IL (US); Sean Flynn, Warwick, RI (US); Jens Hupkau, Ashaway, RI (US); Randy A. Poss, Fond du Lac, WI (US); Bruce R. Pease, Coventry, RI (US)

(73) Assignee: Hexagon Metrology, Inc., North Kingstown, RI (US)

( * ) Notice: Subject to any disclaimer, the term of this patent is extended or adjusted under 35 U.S.C. 154(b) by 1109 days.

(21) Appl. No.: 12/192,600

(22) Filed: Aug. 15, 2008

(65) Prior Publication Data

US 2010/0039391 A1 Feb. 18, 2010

(51) Int. Cl.
*G06F 3/041* (2006.01)

(52) U.S. Cl.
USPC .............................................. 345/173; 702/85

(58) Field of Classification Search
USPC ............... 345/156–184; 178/18.01–19.07; 341/22–34; 340/407.1–407.2; 702/85–107
See application file for complete search history.

(56) References Cited

U.S. PATENT DOCUMENTS

| 5,198,990 | A | 3/1993 | Farzan et al. |
| 5,437,044 | A | 7/1995 | Hohner et al. |
| 5,553,864 | A | 9/1996 | Sitrick |
| 5,808,434 | A | 9/1998 | Kokura et al. |
| 5,825,408 | A | 10/1998 | Yuyama et al. |
| 5,842,045 | A * | 11/1998 | Nakamura ...................... 710/63 |
| 5,953,687 | A * | 9/1999 | Zink et al. ..................... 702/168 |
| 5,970,431 | A | 10/1999 | He |
| 6,094,204 | A | 7/2000 | Takizawa |
| 6,158,136 | A | 12/2000 | Götz et al. |
| 6,285,842 | B1 | 9/2001 | Katamoto et al. |
| 6,433,821 | B1 | 8/2002 | Gouhara et al. |
| 6,519,052 | B1 | 2/2003 | Oneda et al. |
| 6,741,906 | B2 | 5/2004 | Walther et al. |
| 2001/0026699 | A1 | 10/2001 | Ishikura |
| 2003/0040884 | A1 | 2/2003 | Walther et al. |
| 2003/0076302 | A1* | 4/2003 | Langstraat .................... 345/161 |
| 2005/0166413 | A1* | 8/2005 | Crampton ....................... 33/503 |
| 2006/0291889 | A1 | 12/2006 | Kwak et al. |

(Continued)

FOREIGN PATENT DOCUMENTS

| DE | 198 09 690 A1 | 9/1999 |
| DE | 100 07 508 A1 | 8/2001 |
| DE | 203 13 182 U1 | 12/2003 |

(Continued)

*Primary Examiner* — Liliana Cerullo

(74) *Attorney, Agent, or Firm* — Wolf, Greenfield & Sacks, P.C.

(57) ABSTRACT

Coordinate measuring machines typically include a jogbox that allows an operator to control movements of a probe with a joystick and dedicated buttons. By facilitating advanced interaction between the jogbox and the dimensional metrology application, the jogbox may be used to control most or all of the functional aspects of the dimensional metrology application, including, in some instances, control of the coordinate measuring machine. The jogbox may include an adaptability of communications protocol such that it may interact with any one of a number of types or brands of coordinate measuring machines. A dynamic and flexible display and/or user input system may be employed to facilitate the use of a single jogbox with different systems. Further, the inherent flexibility of various jogbox embodiments disclosed herein may allow different categories of users to select and/or customize a jogbox interface.

25 Claims, 10 Drawing Sheets

(56) References Cited

U.S. PATENT DOCUMENTS

| | | |
|---|---|---|
| 2007/0097381 A1* | 5/2007 | Tobiason et al. .............. 356/604 |
| 2007/0242036 A1 | 10/2007 | Wilson et al. |
| 2008/0139895 A1 | 6/2008 | Baumgart et al. |

FOREIGN PATENT DOCUMENTS

| | | |
|---|---|---|
| EP | 0 851 401 A2 | 7/1998 |
| WO | WO 93/25004 A1 | 12/1993 |
| WO | WO 97/46917 A1 | 12/1997 |

* cited by examiner

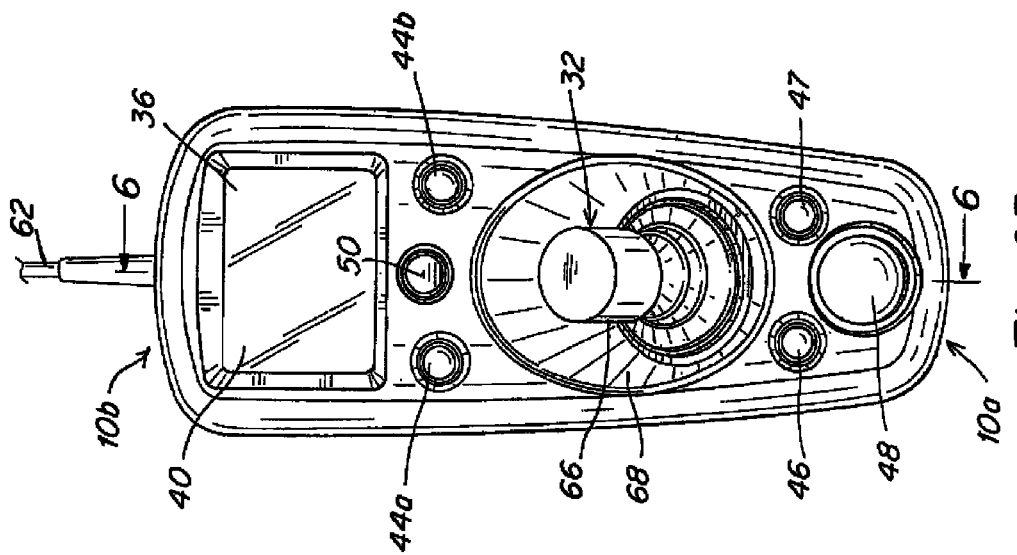
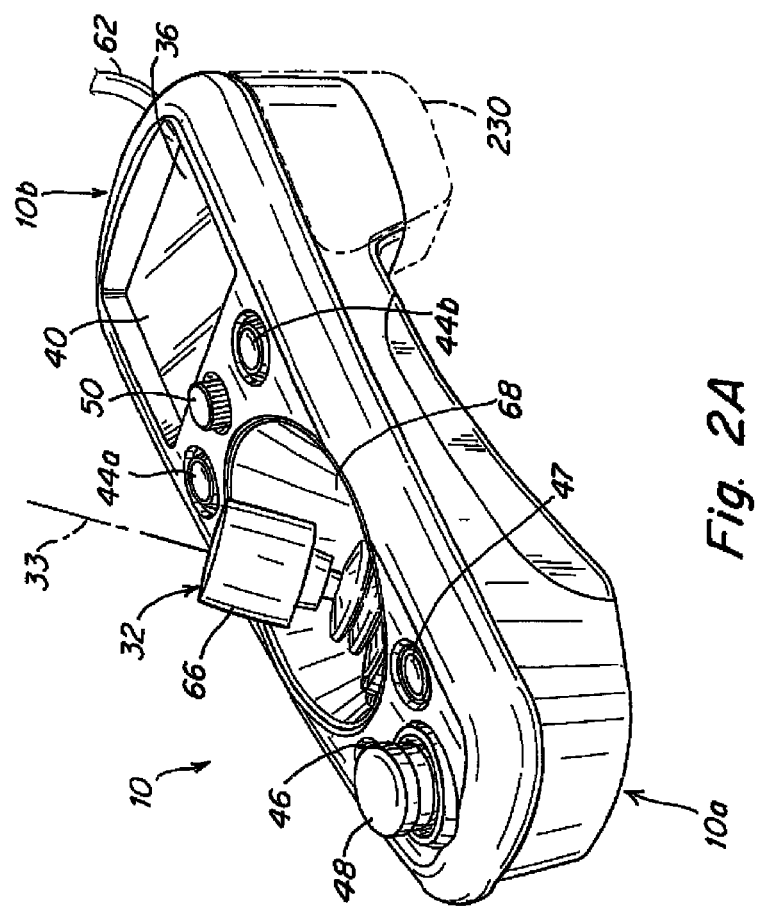

JOGBOX FOR A COORDINATE MEASURING MACHINE

DESCRIPTION OF THE RELATED ART

Coordinate measuring machines are in common use for dimensional inspection of workpieces. Typically, a workpiece is secured to a table, and a probe, such as one using a touch sensor, is movable in three dimensions within a measurement volume to contact the workpiece at various points on the workpiece, or to drag along a surface of the workpiece. In many coordinate measuring machines, the probe is movable in the x, y and z directions with a carriage, a bridge and a Z-ram, respectively, or with another suitable combination of movable components. When the probe contacts the workpiece, measuring scales in the x, y and z directions are read to obtain the position coordinates of the contacted point on the workpiece. By contacting various points on the workpiece, measurements of workpiece features can be obtained.

Coordinate measuring machines typically have a controller which may be programmed to move the bridge, carriage and Z-ram (or other suitable components) to perform a series of measurements for a certain type of workpiece. In this manner, a part is secured to the table, and the coordinate measuring machine automatically proceeds with the measurement of various workpiece features. At times, manual control of the coordinate measuring machine is desired. As such, coordinate measuring machines typically include a portable jogbox which allows an operator to control movement of the probe with a joystick and/or dedicated buttons. Based on input from the joystick and the buttons, the jogbox sends signals, such as control signals, to the coordinate measuring machine controller regarding movement of the probe. In some coordinate measuring machines, the jogbox receives some limited data from the coordinate measuring machine controller, such as the current coordinates of the probe. One example of a jogbox is a Brown and Sharpe jogbox part number 182-194-1, which is typically used with a Global Coordinate Measuring Machine, Models A, B, C or D. Historically, a jogboxes has communicated with its associated machine controller via a cable which attaches the jogbox to the controller.

Measurement data generated by the coordinate measuring machine is typically downloaded to a computer which includes a dimensional metrology software package or other dimensional metrology application. The dimensional metrology software may be used to analyze the measurement data and to create data and analysis reports. In some coordinate measuring machine systems, information from the dimensional metrology application is provided to the jogbox.

SUMMARY

The functionality of dimensional metrology software applications is consistently growing, and in terms of real-time interaction with coordinate measuring machine controllers, such applications are increasingly being used in an integrated manner with the controllers rather than only as recipients of data sent from the controller. For example, in some known systems, a dimensional metrology application may be configured to send information to a coordinate measuring machine controller. The inventors have recognized that a more sophisticated, flexible and technically advanced jogbox would better permit the jogbox to be incorporated into an integrated system of controllers and dimensional metrology software applications. According to one aspect of the invention, by facilitating advanced interaction between the jogbox and the dimensional metrology application, the jogbox may be used in some embodiments to control some, most or all of the functional aspects of the dimensional metrology application, including, in some instances, the communication of information to the coordinate measuring machine.

According to another aspect of the invention, the jogbox includes an adaptability of communications protocol such that it may interact with any one of a number of types or brands of coordinate measuring machines.

In a further aspect of the invention, a dynamic and flexible display and/or user input system is employed to facilitate the use of a single jogbox with different systems. Further, the inherent flexibility of various jogbox embodiments disclosed herein may allow different categories of users to select and/or customize a jogbox interface.

As the utility of the jogbox increases, its time period of use also may increase. Various ergonomic improvements, ease-of-use characteristics, and durability improvements are disclosed herein.

All aspects of the invention need not be present in various embodiments of the invention, although one embodiment may instantiate multiple aspects.

According to one embodiment of the invention, a method is provided for providing signals to a coordinate measuring machine controller using a jogbox having a display and a touch screen associated with the display. The method includes displaying a first virtual interface element on a first area of the display, the first virtual interface element indicating a first functionality, and touching a first area of the touch screen while the first virtual interface element is displayed, the first area of the touch screen being associated with the first area of the display. In response to the touching of the first area of the touch screen while the first virtual interface element is displayed, the jogbox sends a first signal associated with the first functionality to the coordinate measuring machine controller. The method further comprises displaying a second virtual interface element on the first area of the display, the second virtual interface element indicating a second functionality different from the first functionality, and touching the first area of the touch screen while the second virtual interface element is displayed. In response to the touching of the first area of the touch screen while the second virtual interface element is displayed, the jogbox sends a second signal associated with the second functionality to the coordinate measuring machine controller.

The method may further include touching a second area of the touch screen to switch the display on the first area of the display from the first virtual interface element to the second virtual interface element. Sending the first signal associated with the first functionality to the coordinate measuring machine controller may include sending the first signal to a computer configured to execute a metrology application, wherein, in response, the computer sends one or more signals to the coordinate measuring machine controller. The method may further include receiving, by the jogbox, a signal from a computer configured to execute a metrology application, the signal configured to cause a third virtual interface element to be displayed on the display. The first functionality may include movement of components of the coordinate measuring machine.

According to another embodiment of the invention, a jogbox for a coordinate measuring machine is provided. The jogbox includes a transmission element configured to send signals to a coordinate measuring machine controller associated with the coordinate measuring machine, and a display configured to display a plurality of virtual interface elements, each of the virtual interface input elements being associated with a functionality. The jogbox further includes one or more processors configured to control the display of virtual interface elements on the display and further configured to recognize user selections of the virtual interface elements. The one or more processors also are configured to select the signals to send to the controller based on the user selections of the virtual interface elements.

The jogbox may further include a touch screen overlaid on the display, the touch screen being configured to allow selection of the virtual interface elements by touching the touch screen. The one or more processors that are configured to select the signals to send to the controller based on the user selections may include one or more processors configured to send signals indicating a location of user selection on the display or the touch screen. The one or more processors that are configured to select the signals to send to the controller based on the user selections may include one or more processors configured to send signals indicating the functionality selected by the user. The one or more processors may be configured to receive instructions from an external device to create a virtual interface element on the display. The transmission element may include a wired connection to the controller and/or may include a wireless transmitter. The jogbox may be portable.

In some embodiments, the transmission element that is configured to send signals to the controller also may be configured to send signals to a computer configured to execute a metrology application. In some embodiments, the jogbox may include a first transmission element configured to send signals to the controller and a second transmission element configured to send signals to a computer configured to execute a metrology application. The second transmission element may operate independently from the first transmission element.

According to a further embodiment of the invention, a jogbox for a coordinate measuring machine is provided. The jogbox includes a plurality of user input elements and a transmission element configured to send signals based on user input to a coordinate measuring machine controller associated with the coordinate measuring machine. The jogbox also includes a processor configured to receive an indication of an identifying characteristic of the coordinate measuring machine, the processor being further configured to select a communication protocol with the coordinate measuring machine controller based on the identifying characteristic, the communication protocol defining the types of signals to be sent to the coordinate measuring machine controller.

The jogbox may further include a display configured to display a plurality of virtual interface elements as the user input elements, and a store of virtual interface element definitions associated with a plurality of different coordinate measuring machines. The processor may be configured to select which virtual interface elements from the store of virtual interface elements to display based on the identifying characteristic of the coordinate measuring machine. The jogbox may further include a touch screen associated with the display. The jogbox may further include cabling hardware that senses a sequence of jumpers of pins being attached to the cabling hardware, the pins being in communication with the coordinate measuring machine controller, wherein the identifying characteristic of the coordinate measuring machine comprises the sensed sequence of jumpers. The jogbox may further include a wireless transceiver configured to receive a wireless signal which includes an identifying characteristic of the coordinate measuring machine controller. The identifying characteristic may identify the brand of coordinate measuring machine and/or the type of model of coordinate measuring machine.

According to another embodiment of the invention, a jogbox for a coordinate measuring machine includes a display screen, and a portion of the display screen is controlled by a computer which is configured to run a dimensional metrology application, the computer being external to the jogbox. The jogbox may be configured to receive virtual display elements which are displayed on the display screen, and/or the jogbox may be configured to send coordinates of user touches on the jogbox display screen to the computer that is configured to run a dimensional metrology application.

According to yet another embodiment of the invention, a jogbox for a coordinate measuring machine includes a handheld frame having a surface and a recessed area in the surface, the surface including an imaginary surface extending across the recessed area. The jogbox further includes a joystick attached to the hand-held frame within the recessed area and protruding from the surface, the joystick having a relaxed orientation relative to the surface when no user force is applied to the joystick. In the relaxed orientation, the joystick is oriented at an angle of other than ninety degrees relative to the surface.

The surface from which the joystick protrudes may be a top surface of the jogbox. The joystick may be oriented at an angle of less than 75 degrees relative to the surface. The jogbox has a proximal end and a distal end, with the proximal end configured to be held closer to the user than the distal end, and the joystick may be oriented such that the joystick leans toward the distal end. In some embodiments, the jogbox may further include one or more supports configured to support the jogbox, wherein a top surface of the jogbox is oriented at an angle to the flat surface when the jogbox is supported on a flat surface. The jogbox may further include at least one handgrip region configured for grasping by a user, and when the jogbox is supported on a flat surface, the handgrip region may be elevated above the flat surface and a gap is present between the handgrip region and the flat surface.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2A is a perspective view of a jogbox according to one embodiment of the invention;

FIG. 2B is a plan view of the jogbox depicted in FIG. 2A;

DETAILED DESCRIPTION

Figure 1:
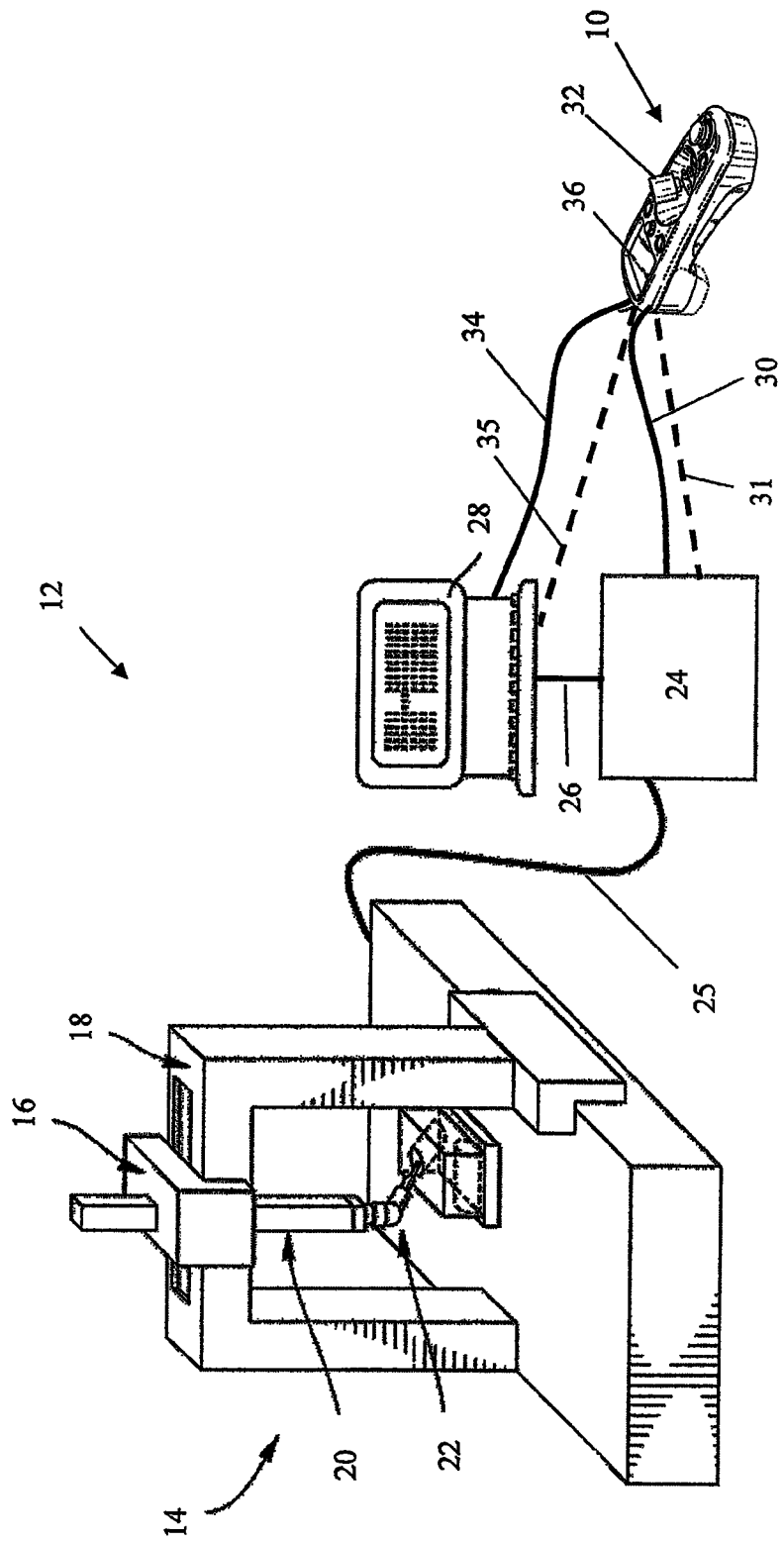
FIG. 1 shows a coordinate measuring machine system according to one embodiment of the invention.

One embodiment of a jogbox 10 being used as part of an integrated coordinate measuring machine system 12 is shown in FIG. 1. A coordinate measuring machine 14 includes a carriage 16, a bridge 18 and a Z-ram 20 for moving an articulating probe 22 in the x, y and z directions respectively. A coordinate measuring machine controller 24 is operatively connected to the actuators of carriage 16, bridge 18, and Z-ram 20 via a cable 25. As controller 24 receives coordinate measurement data from the coordinate measuring machine, it sends the data via a connection 26 to a computer 28 that is configured to execute a dimensional metrology application. The dimensional metrology application may analyze the data, and in some embodiments, determine additional desired measurements and provide corresponding control commands to controller 24.

Jogbox 10 may be used for manual control of the coordinate measuring machine. Manual control may be used, for example, to perform an alignment to establish an initial positioning of a workpiece, to develop part programs, or to place the probe in a safe position when securing or removing a workpiece. Use of a joystick 32 on jogbox 10 may send signals to controller 24 that result in the movement of probe 22. Jogbox 10 may be operatively connected to coordinate measuring machine controller 24 with a communications cable 30 and/or with a wireless connection 31. It should be noted that while a bridge-type coordinate measuring machine is illustrated in FIG. 1, any type of coordinate measuring machine may be used according to various embodiments of the invention, for example, a cantilever coordinate measuring machine. Also, an articulating probe is not required as any suitable probe (contact or non-contact) may be used.

According to one aspect of the invention, jogbox 10 may send signals to computer 28 to control the dimensional metrology application being executed on the computer 28. Jogbox 10 may be operatively connected to computer 28 with a communications cable 34 and/or with a wireless connection 35. In some embodiments, the dimensional metrology application sends signals or control programs to controller 24 that instruct the controller to move the probe, in response to signals received by the dimensional metrology application from jogbox 10 through communications cable 34 and/or wireless connection 35. In some embodiments, communications cable 34 may be a dedicated cable used solely for communication between jogbox 10 and the dimensional metrology application executing on computer 28. In other embodiments, communications cable 34 may be configured to communicate with other software, firmware and/or hardware of computer 28 and/or to communicate with controller 24 through computer 28.

Regarding data flow in the opposite direction, in some embodiments computer 28 may send measurement data or other information to jogbox 10 though controller 24. In some embodiments, the measurement data or other information may be sent by computer 28 to jogbox 10 through communication cable 34 and/or wireless connection 35.

In some embodiments, the dimensional metrology application is permitted to control the display of graphics on a portion or all of a display screen 36 of jogbox 10. For purposes herein, the term "graphic" encompasses not only drawings, figures, icons, etc., but also alpha-numeric text. The graphics may include information from the dimensional metrology application and/or represent a virtual interface element to accept inputs to the dimensional metrology application from the jogbox. In some embodiments, a touch screen may overlay display screen 36 on the jogbox such that the dimensional metrology application may present a customized interface element (such as an icon or a button, for example) to a jogbox user, and the user may provide an input by touching the area of the touch screen that overlays or is otherwise associated with the interface element. A touch screen may be one or more separate elements overlaying the display screen, may be attached to the display screen, may be integral with the display screen, or may be otherwise associated with the screen.

Figure 8:
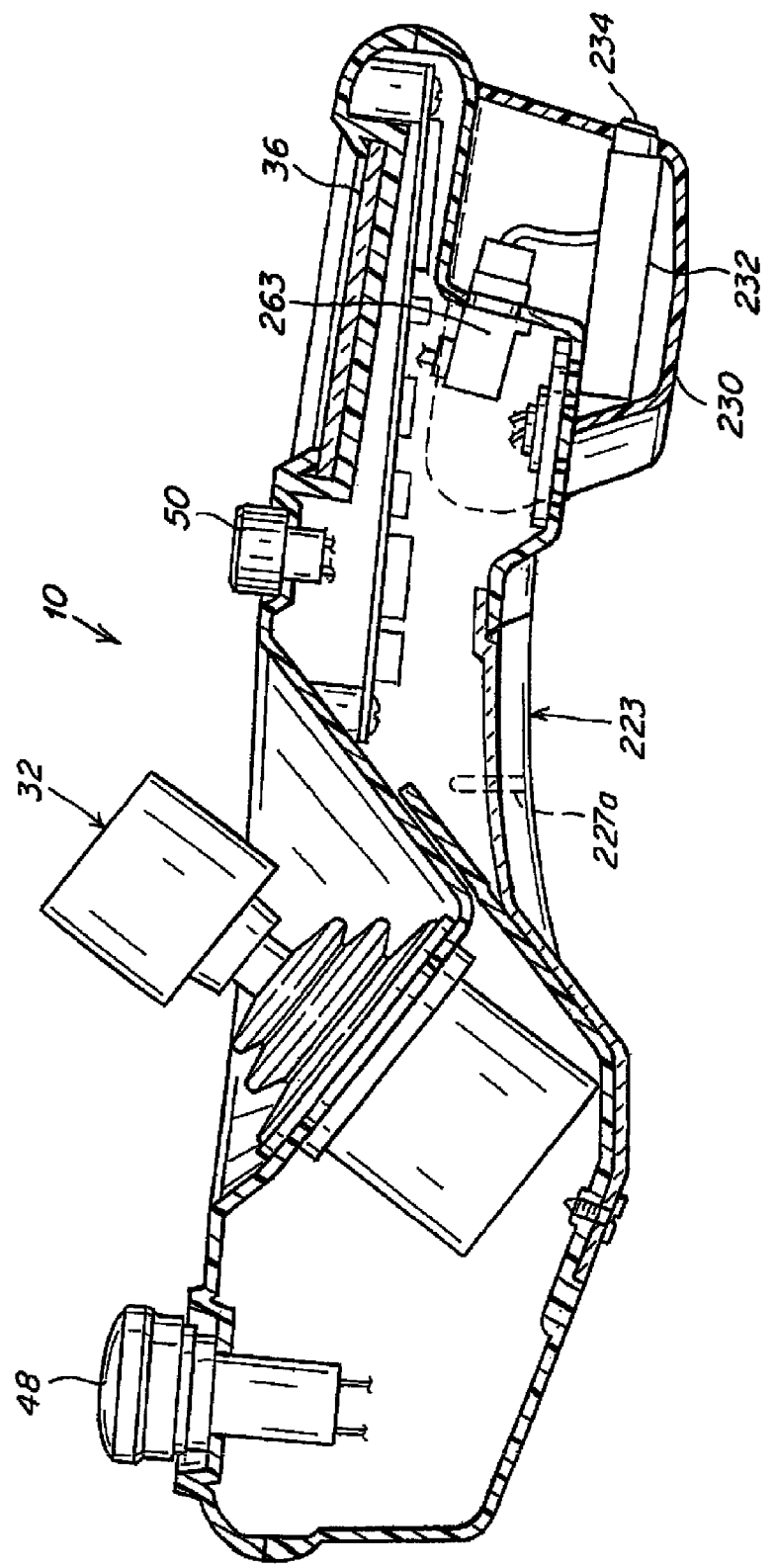
FIG. 8 is a side cross-sectional view of the jogbox illustrated in FIGS. 2A, 2B, 6 and 7 with an attached wireless transceiver module, according to aspects of the invention.

FIGS. 2A and 2B show more detailed views of one embodiment of jogbox 10 in a wired configuration. During use, a proximal end 10a of jogbox 10 may often be oriented toward a user and a distal end 10b of jogbox 10 may often be oriented away from a user. A wireless transceiver module 230, which is depicted with dashed lines, may be attached to jogbox 10 allowing jogbox 10 to operate in a wireless mode, as described below with respect to FIG. 8. In this embodiment, jogbox 10 includes display screen 36 and an associated touch screen 40, as described in detail below. Other user input elements include one or more physical enable buttons 44a and 44b, a machine start button 46, an emergency stop button 48, a speed control knob 50, and joystick 32. In some embodiments, the user input elements also may include a wireless mode on/off button 47. The user input elements are described further below after a description of embodiments of the display screen and the touch screen and methods of their use.

Jogbox 10 includes a graphics display such as display screen 36 in some embodiments. The display may be any suitable display device, such as an LCD screen or a plasma screen as only two examples of many. By providing a graphics display, a multiplicity of arrangements of information may be available to a user. In some cases, various modes may be selected based on the category of user using the jogbox. For example, a coordinate measuring machine operator may select an operator mode which presents the current coordinate position of the probe and other status information such as the progress of a measurement program. In another example, a service mode may present information regarding the time since the last service or operating hours or cycles of various components.

When the graphics display device is combined with an input device such as a touch screen, the jogbox becomes a powerful tool that is configurable for use with different types of coordinate measuring machines, and may be customized for a user's requirements. In some embodiments, the jogbox may be used to control the functionality of a dimensional metrology application, including control of the coordinate measuring machine via the dimensional metrology application.

When an input device is supplied with the display device, the various modes may present different sets of virtual interface elements to the user. For example, an operator mode may present virtual input buttons on display screen 36 for one or more of: controlling the enabling of separate axes of movement on the coordinate measuring machine; selecting run or hold; selecting an operator position; or any of a plurality of other inputs. A service mode may present different virtual input buttons and/or information as compared to the operator mode. For example, the service mode may include input buttons related to selecting the display of various types of information, and also may include input buttons for initiating or invoking test procedures or advanced diagnostics. A programming mode may display virtual interface elements that allow a programmer to enter a new measurement program for measuring a new workpiece. Not all of the described modes need to be included in any given embodiment, and further modes may be provided.

As mentioned above, historically, a jogbox for a particular coordinate measuring machine has been attached to the coordinate measuring machine with a communication cable. Typically, the jogbox has not been easily detached from the controller. As such, a typical jogbox may be designed to operate only with one specific type of coordinate measuring machine, and therefore the input buttons and communications protocol are suitable only for that type of coordinate measuring machine. According to one aspect of the invention, jogbox 10 may hold numerous pages of virtual interface elements and/or informational graphics for different types and/or brands of coordinate measuring machines in internal memory, or on any suitable computer-readable or computer storage medium, such that a single jogbox is usable with any one of many different types of coordinate measuring machines. In some embodiments, to provide seamless operation requiring limited input by a user, jogbox 10 may be configured to automatically recognize the type and/or brand of coordinate measuring machine with which the jogbox is operating. In such an embodiment, the proper pages may be automatically presented to the user.

According to one embodiment of automatic recognition, jogbox 10 automatically determines the type of coordinate measuring machine with which the jogbox is operating by sensing the sequence of the jumpers of the pins being attached to the jogbox cable attachment hardware. In some embodiments, jogbox 10 stores associations between certain sequences of jumpers and certain types of coordinate measuring machines. In embodiments where the jogbox is being used in a wireless mode with a coordinate measuring machine, the jogbox may send a wireless request for an identification from the coordinate measuring machine controller. In response, the controller may transmit the requested identification and other optional information that may aid in configuring the jogbox for use with the coordinate measuring machine. Of course, in some embodiments, the jogbox may be configured to accept direct user input regarding the type of coordinate measuring machine being used.

For purposes herein, the term "type" as it relates to coordinate measuring machines, is intended to include various categorization schemes. For example, in some embodiments, different types of coordinate measuring machines may mean different brands of coordinate measuring machines. In other embodiments, different types of coordinate measuring machines may mean different physical arrangements of axis carriages, such as gantry-type versus cantilever type.

Once jogbox 10 recognizes the type of coordinate measuring machine with which it is communicating, communication between jogbox 10 and controller 28 may be based on existing communication protocols, such as, as but two examples, the RS232 communications protocol used on existing Brown & Sharpe jogboxes, and the RS422 communications protocol used on Sheffield Measurement Inc. Remote Control Unit.

Operators and other users may be most comfortable with the arrangement of input hardware provided on already-existing jogboxes. According to one aspect of the invention, jogbox 10 may include a legacy mode such that the physical input buttons or other input hardware of earlier generations of jogboxes may be emulated on the display screen with virtual buttons or other suitable virtual input interfaces. The user may activate the interfaces by contacting the touch screen in some embodiments.

It is important to note that for embodiments disclosed herein, a touch screen may be touched or contacted directly by a user (e.g., with a finger or a gloved finger) or may be touched or contacted with a tool, such as a stylus for example. Additionally, in some embodiments, instead of, or in addition to, providing a touch screen, "soft buttons" may be provided on the jogbox. For example, a graphic indicating a first functionality may be displayed near the edge of display screen 36, and a physical button may be positioned just to the outside of the display screen. To select the graphic, the user pushes the physical button. In a different mode, or on a different presented arrangement of graphics, the graphic presented near to the physical button may be different and may indicate a second, different functionality. Selection of this graphic (by pressing the same physical button) may initiate the second functionality. In this manner, a dynamic display may be used without a touch screen. For purposes herein, the term "virtual interface element", in addition to encompassing displayed graphics that are selectable or otherwise manipulable with a touch screen, encompasses soft button arrangements and other arrangements whereby the displayed graphic which a user can select is changeable. For example, jogbox 10 may include a touchpad which allows a user to move a pointer on display screen 36 to select a virtual input element.

According to another aspect of the invention, advanced interaction between the jogbox and a dimensional metrology software application may be provided. For example, display screen 36 may reserve a specific area, or canvas 60 (see FIG. 3), for use by an external host, such as a computer executing a dimensional metrology application. The external host may transmit various types of information (e.g., raw measurement data, processed data, probe position, etc.) to jogbox 10 for display on canvas 60. The information may be presented on display screen 36 with graphics, animations, or simple alphanumeric readouts, and the particular display of the information (e.g., graphics) may be created by the external host. The external host may create virtual interface elements on canvas 60 so that the user can issue commands to the external host, or provide information to the external host. For example, a dimensional metrology application may present five graphics on canvas 60, each graphic representing a different type of workpiece that is to be measured. The user then selects which piece is to be measured, and the dimensional metrology application prepares accordingly.

The entire display screen may be used as a canvas for an external host in some embodiments. For example, one of the modes available for user selection may be an "external host control" mode which allows the user to control the external host using the touch screen or other suitable input devices. In some embodiments, when a user touches an area of touch screen 40 that falls within the area reserved for the external host, jogbox 10 sends the touch location to the external host, and the external host decides what action to take (if any) in response.

Figure 3:
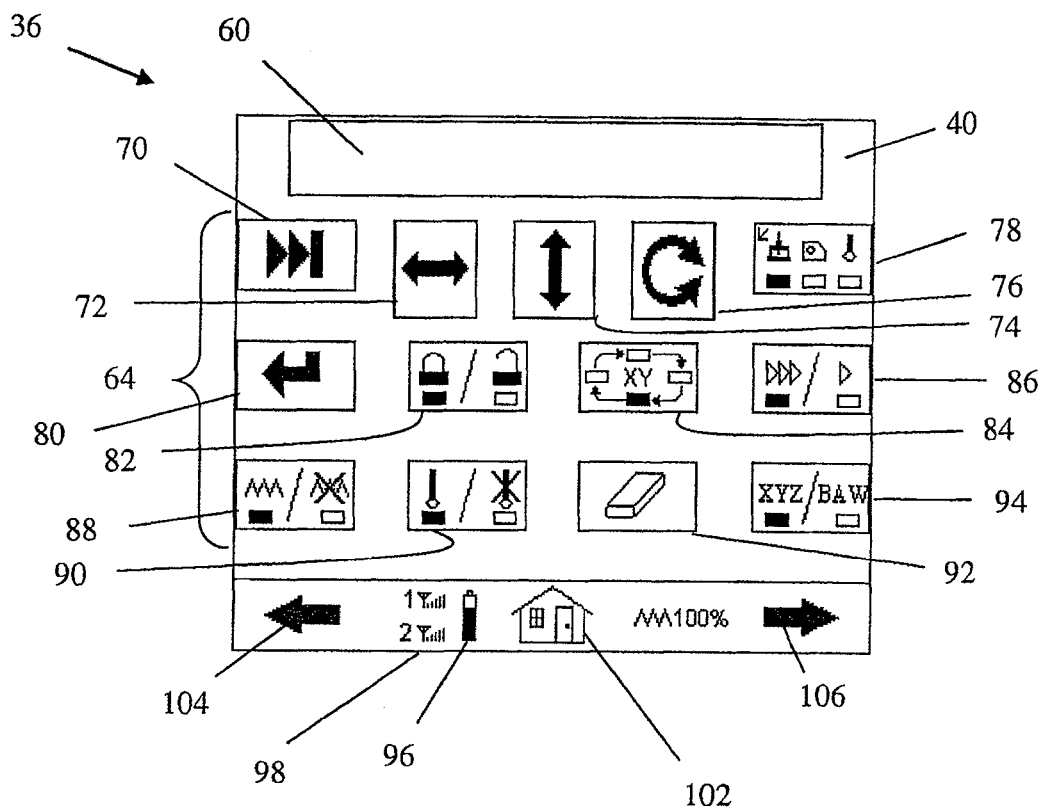
FIG. 3 shows a display with virtual interface elements according to one embodiment of the invention.

FIG. 3 depicts one example of an arrangement of graphics on display screen 36. As described above, a touch screen 40 may overlay the display screen 36, may be the same element as the display screen 36, may be integral with the display screen 36 or may otherwise be associated with display screen 36. Display screen 36 is shown in an operator mode, which includes thirteen virtual interface elements in an interface element area 64 in some embodiments.

In the embodiment of FIG. 3, interface element area 64 includes a print button 70, a left/right enable button 72, a forward/backward enable button 74, an up/down button 76, a jog mode button 78, a done button 80, a lock/unlock button 82, an operator position button 84, a slow/fast button 86, a run/hold button 88, a probe enable button 90, a delete point button 92, and a shift button 94. In some embodiments, buttons/graphical elements in interface element area 64 may include internationally recognized/accepted symbols. In some embodiments, some or all of the buttons/graphical elements in interface element area 64 may be tailored to a particular language, particular graphical system, particular industry standard, particular unit system, etc. based on a user selection.

Operator position button 84 provides the user with the ability to inform the jogbox and/or controller of the user's position relative to the table of the coordinate measuring machine. Based on this information, the direction of movements of various coordinate measuring machine components in response to joystick movement may be altered. For example, when a user moves from one side of a coordinate measuring machine to the opposite side, the user may turn 180° relative to the coordinate measuring machine. In such a circumstance, the user may wish to alter the direction that the probe moves in response to joystick movement, e.g., so that pushing the joystick forward moves the bridge (and hence probe) in a direction opposite to the direction of movement which would occur before alteration. In some embodiments, jogbox 10 may automatically sense an orientation and/or position of jogbox 10 relative to the coordinate measuring machine and adjust movement directions automatically.

A status indicator area includes a battery charge indicator graphic 96, a wireless signal strength indicator graphic 98. The status indicator area also may include navigational elements. In some embodiments, a graphic may be associated with a particular page to allow the user to jump to the particular page. For example, a home page graphic 102 allows the user to jump to a main home page. In the embodiment of FIG. 3, forward and backward graphics 104 and 106 are also used to navigate between pages. In some embodiments, different pages may be associated with different modes of operation, e.g. a gloved mode (see FIG. 4 below), a default mode, etc. In some embodiments, additional pages may include buttons to control advanced functionality that may be less frequently used.

In some embodiments, any or all of the graphics on one or more pages may be customizable. In some embodiments, graphical elements and/or layouts may be selected from options provided with jogbox 10, controller 24, the dimensional metrology application software, the hardware of computer 28 and/or coordinate measuring machine 14. In some embodiments, custom graphics and/or layouts may be provided by a user of the system 12. In some embodiments, jogbox 10 may be configured to enable a user to select what functionality is presented on one or more pages and/or to select what functionality is associated with one or more graphical elements.

Figure 4:
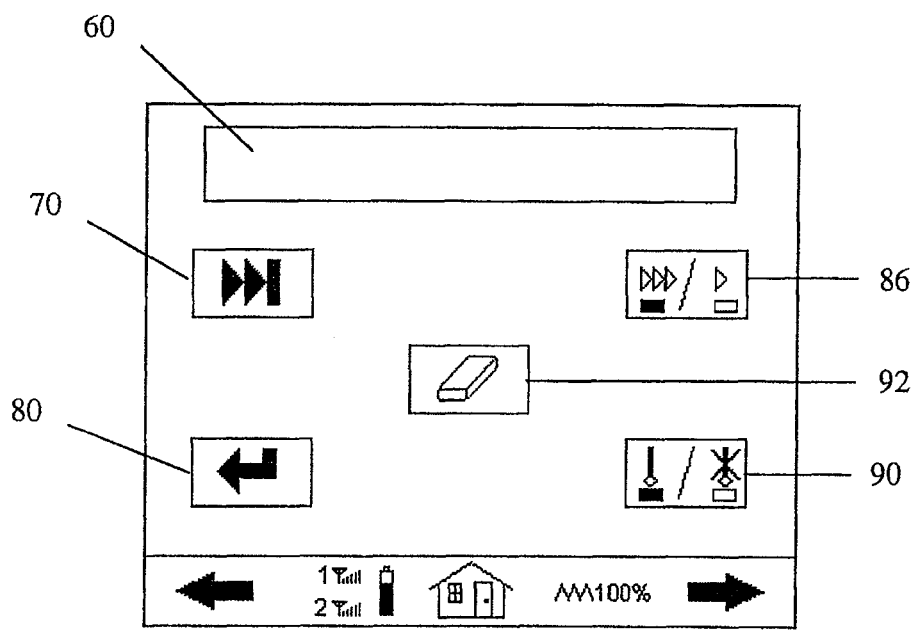
FIG. 4 shows a display in gloved operation mode, according to one embodiment of the invention.

An example of another mode of operation on the same jogbox display screen, in this case a "gloved operation" mode, is shown in FIG. 4. In this mode, fewer buttons are displayed and the buttons are spaced further apart. Such a mode may be useful when the user is wearing gloves and has more limited ability to contact the touch screen with precision. The buttons displayed in gloved mode may be the most frequently used buttons. In some embodiments, the buttons (or other virtual interface elements) may be larger than in other modes to further improve gloved operation.

The management and customization of display screen 36 (and optionally touch screen 40) may be implemented with software, firmware, hardware, or any suitable combination thereof. In some embodiments, overall management of display screen 36 and touch screen 40 is provided by firmware to allow for flexibility both for developing standard pages and for user customization. The overall page layout as well as certain pages may be read from files so that the displayed pages may be expanded and revised without changes to the firmware. Certain pages, such as service level pages for example, may be maintained as static in memory for consistency purposes. Some or all of the graphic files, such as image files, may be protected from revisions for safety purposes. Further description of firmware embodiments and its use for control of aspects of the jogbox other than display screen 36 are described further below with reference to FIG. 11. Of course, control and management of signals and applications associated with the jogboxes disclosed herein may be implemented with firmware different from the structures disclosed herein, and firmware is not necessarily required to implement various aspects and embodiments.

Figure 5:
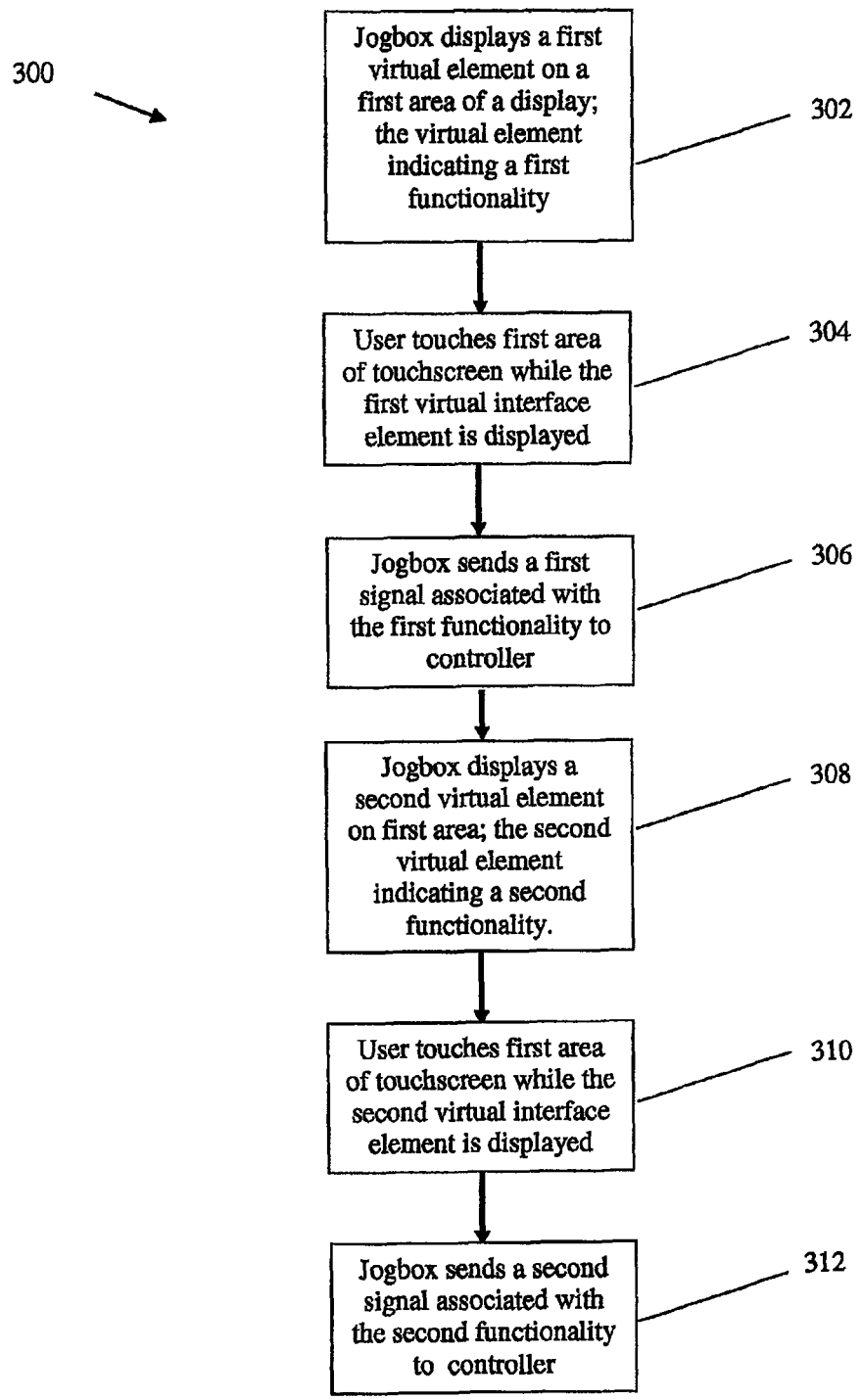
FIG. 5 shows a flowchart of a method of providing signals to a coordinate measuring machine controller using a jogbox, according to one embodiment of the invention.

One method 300 of providing signals to a coordinate measuring machine controller using a jogbox is shown in the flowchart of FIG. 5. In method 300, the jogbox has a display device and a touch screen associated with the display device. In an act 302, the jogbox displays a first virtual element on a first area of the display, the first virtual interface element indicating a first functionality. The functionality may be associated with controlling the movement of the probe of the coordinate measuring machine. Or, the functionality may be associated with control of the jogbox, for example, a selection of which mode to place the jogbox in, or which page of graphics to display. The functionality may be related to providing information to the coordinate measuring machine controller or an external host.

In an act 304, a user touches a first area of the touch screen while the first virtual interface element is displayed, the first area of the touch screen being associated with the first area of the display device. In many embodiments, the touch screen overlies the display screen and the first area of the touch screen is situated directly over the first area of the display device. The touching of the touch screen may be accomplished with a direct touch by a user's finger, or a stylus or other implement may be used to touch the touch screen.

In an act 306, the jogbox sends a first signal associated with the first functionality to the coordinate measuring machine controller. The first signal is sent in response to the touching of the first area of the touch screen.

In an act 308, a second virtual interface element on the first area of the display device is displayed. The second virtual interface element indicates a second functionality different from the first functionality. The second virtual interface element may replace the first virtual interface element due to a change in jogbox mode, or a change to the page being displayed. In some cases, other virtual interface elements on the display screen may remain when the first virtual interface element is replaced by the second virtual interface element. In an act 310, the first area of the touch screen is touched while the second virtual interface element is displayed. In response to the touching of the first area of the touch screen while the second virtual interface element is displayed, in an act 312, the jogbox sends a second signal associated with the second functionality to the coordinate measuring machine controller.

Turning to hardware features of the embodiment of jogbox 10 that is depicted in FIGS. 2A and 2B, display screen 36 may be recessed to protect the screen from damage (see also FIG. 6 below). In the embodiment shown in FIGS. 2A and 2B, display screen 36 is located toward a distal end 10*b* of jogbox 10. However, in some embodiments, display screen 36 may be positioned at a location other than the distal end, for example toward the proximal end 10*a* of jogbox 10, in a middle of jogbox 10, or as a retractable screen that protrudes from one or both sides of jogbox 10.

Jogbox 10 includes a speed control knob 50 for controlling the speed of moving carriages, etc. on coordinate measuring machine 14. Speed control knob 50 may be connected to a potentiometer as part of the control circuitry. In some embodiments, speed control may be provided with a virtual interface element on display screen 36.

Emergency stop button 48 is provided toward the proximal end 10*a* of jogbox 10. Emergency stop button 48 may be operatively connected to its own RF transmitter in embodiments where jogbox 10 has wireless capabilities. In a tethered mode, emergency stop button 48 may be operatively connected to its own communication wire (not shown), which may be held within a cable 62.

Two enable buttons 44*a*, 44*b* are positioned toward the distal end 10*b* of jogbox 10 such that a user may conveniently access the buttons with a thumb of the hand that is holding jogbox 10. Two enable buttons 44*a*, 44*b* are provided so that an enable button is conveniently located for thumb actuation regardless of whether the user is using a right or left hand to hold jogbox 10. In some embodiments, jogbox 10 may have only one enable button, may have more than two enable buttons, or may have no enable buttons.

Jogbox 10 includes a machine start button 46 and a wireless mode of/off button 47 that are positioned toward a proximal end of jogbox 10 to allow convenient thumb actuation. Of course, in some embodiments, more than one machine start button 46 and/or more than one wireless mode on/off button 47 may be provided. Button 47 may be a wireless mode on/off button when jogbox 10 is configured for wireless operation, and may be a non-functional button or have a different function when jogbox 10 is not configured for wireless operation.

Joystick 32 is provided for manual control of probe movement. Moving the joystick left and right and forward and backward controls the x and y direction movements of the coordinate measuring machine. Rotating a knob 66 controls movement of the probe in the z direction. As discussed above, the particular directions, or even axes, that are controlled by joystick movements may be changed as a user changes orientation or position.

Figure 6:
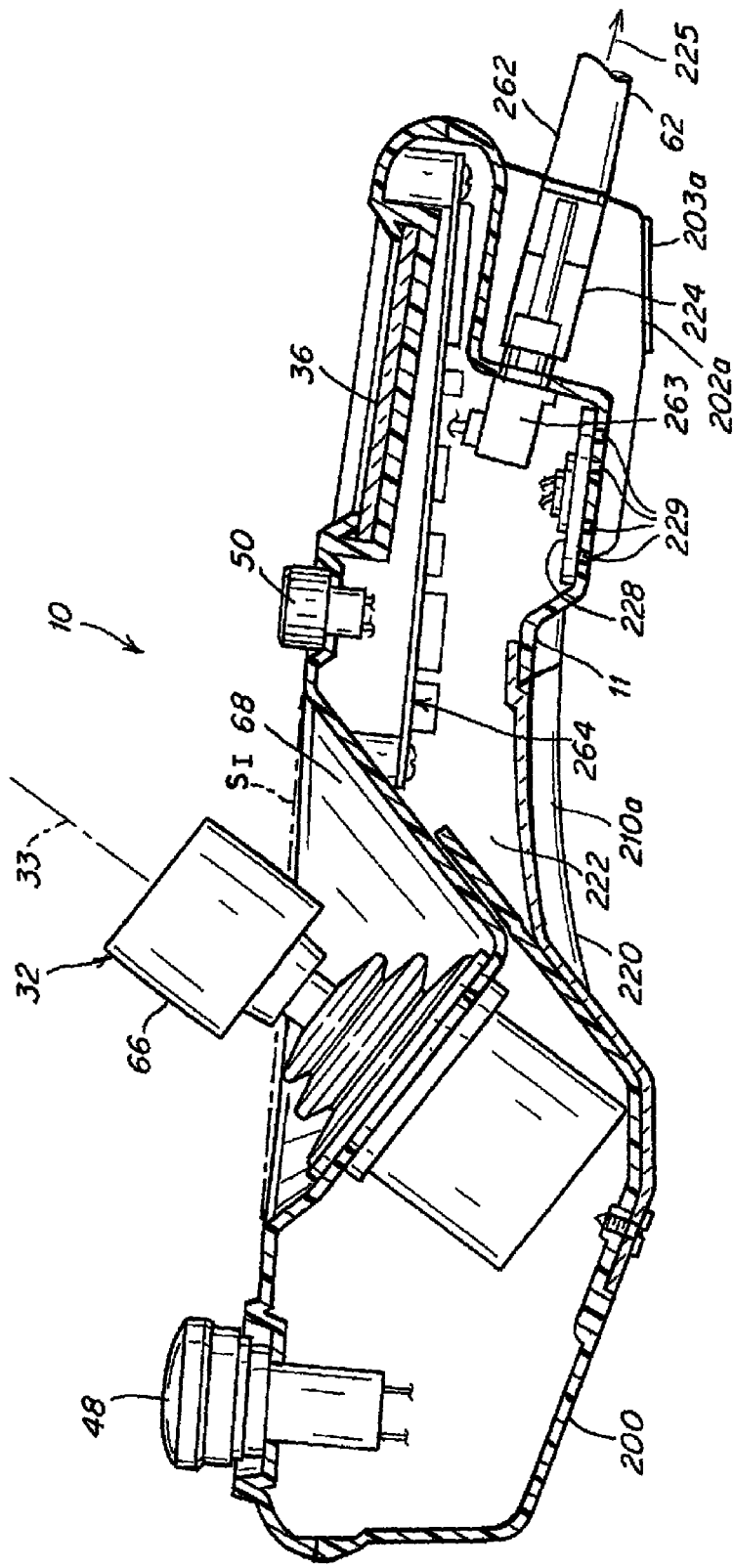
FIG. 6 is a side cross-sectional view of the jogbox illustrated in FIGS. 2A and 2B.

To reduce the risk of damage to joystick 32 when jogbox 10 strikes a surface (for example when dropped), joystick 32 is angled relative to the top surface of the jogbox as shown in both the perspective view of FIG. 2A and the side cross-sectional view of FIG. 6. The risk of damage to the joystick is greater when the joystick hits a surface straight on, i.e., when the length of the joystick forms a ninety degree angle with the impacted surface. By being angled, the joystick cannot strike a flat surface at a ninety degree angle because if the length of the joystick were to fall toward the surface at a ninety degree angle, the distal end of the jogbox would first strike the surface (unless, in limited circumstances, the jogbox falls near the edge of the surface and the leading edge of the jogbox misses the surface and the joystick hits the surface at ninety degrees). To further protect the joystick, joystick 32 may be mounted in a recess 68 in a top surface of jogbox 10, as shown in FIGS. 2A and 2B. In this manner, the joystick has a lower profile relative to the top surface of the jogbox.

Joystick 32 is shown as being angled toward the distal end of jogbox 10 in FIGS. 2A, 2B and 6; however, in other embodiments the joystick may be angled toward the proximal end or in any other suitable direction. The joystick may be mounted at an angle to the top surface of the jogbox without being mounted in a recess, and/or the joystick may be mounted in a recess without being angled relative to the top surface. For purposes herein, angling the joystick relative to a surface of the jogbox means that the general lengthwise direction 33 of the joystick 32 forms an angle other than ninety degrees with the relevant surface of the jogbox, as shown in FIGS. 2 and 6. If the joystick is mounted in a recess 68, the angle may be formed with an imaginary surface $S_I$ that extends across the top of the recess, as depicted in the embodiment of FIG. 6. The surface may be curved, in which case the relevant angle is the angle formed by the general lengthwise direction of the joystick with the surface in the area of protrusion by the joystick.

The lower profile of the joystick may provide a better sightline and easier accessibility to display screen 36 as compared to a joystick that projects straight upwardly and/or not from within a recess. In other embodiments, instead of being positioned in the center of the jogbox in the left/right direction, joystick 32 may be provided toward one side or the other to provide access to the touch screen.

Because a user may hold the jogbox more than an insignificant amount of time, a comfortable and stable method of holding the jogbox may be provided. As shown in the side cross-sectional view of FIG. 6 and the bottom plan view of FIG. 7, two longitudinal mounds 210*a*, 210*b* extend along the outer sides of the underside of jogbox 10 to serve as handgrips. Mounds 210*a*, 210*b* are shaped such that the user's fingers wrap around the mounds and the fingertips extend into a cavity 212, which provides an ergonomic method of holding the jogbox. Two handgrips are provided so that either the left hand or the right hand may be used, however, in some embodiments, only one handgrip may be provided. The surfaces of the handgrips may have friction elements attached. The surfaces of the handgrips may be overmolded with a soft material that provides friction, e.g. textured silicone, rubber, etc. The particular shape and/or appearance of the handgrips 210*a*, 210*b* and/or cavity 212 are not necessarily important to the function of the handgrips.

In some embodiments, a perimeter of a frame 11 of jogbox 10 may be overmolded with a shock absorbent material and/or outfitted with padded material to reduce shocks to the frame and/or electronics in the event of a drop. For embodiments in which the perimeter of jogbox 10 is not overmolded with a shock absorbent material, a removable shock-absorbing element may be provided to cover the perimeter of the jogbox 10, or portions thereof.

Figure 7:
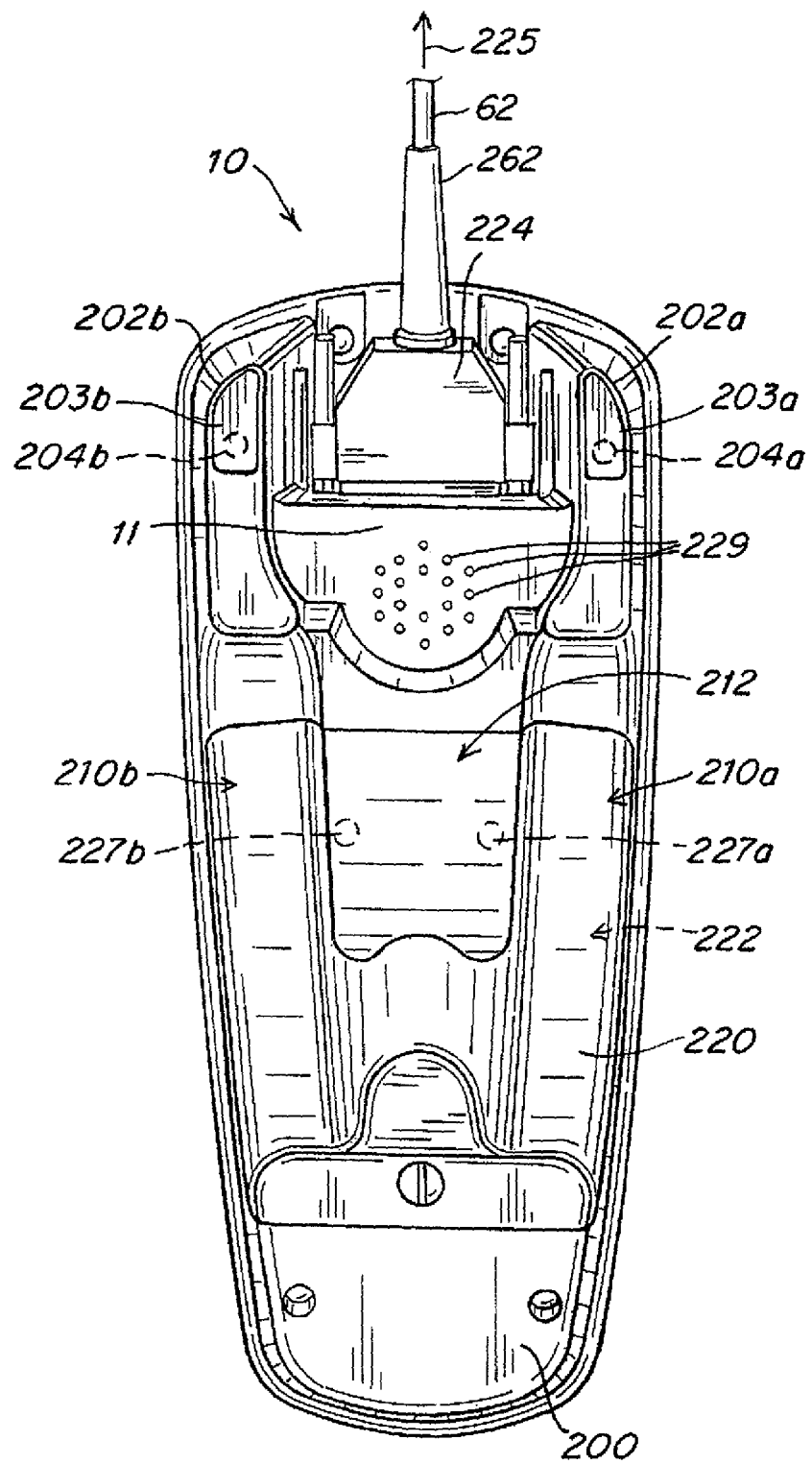
FIG. 7 is a bottom plan view of the jogbox illustrated in FIGS. 2A, 2B and 6.

As shown in the side cross-sectional view FIG. 6, when the jogbox 10 is resting on a surface, a proximal support 200 and distal supports 202*a* and 202*b* of the jogbox elevate the handgrips 210*a* and 210*b* above the surface such that a gap exists between the handgrips 210*a*, 210*b* and the surface. In this manner, a user may easily grasp and pick up the jogbox 10 with one hand. In some embodiments, handgrips may be provided as members that extend from the side of the jogbox. Frictional elements 203*a* and 203*b* may be attached to distal supports 202*a* and 202*b* to prevent jogbox 10 from sliding when resting on a surface as shown in FIGS. 6 and 7.

In some embodiments, jogbox 10 may include one or more speakers 228 for producing sound. Frame 11 of jogbox 10 may include channels 229 for permitting sound from speakers 228 to exit jogbox 10, as shown in FIGS. 6 and 7.

As mentioned above, jogbox 10 may be configured to connect with other devices with a cable and/or to wirelessly communicate with other devices. In some embodiments, jogbox 10 may be configured to connect with other devices using cable 62, which may be detachable. Cable 62 may be detachably connected to a connector receptacle 263 of jogbox 10. A cable connector 224 may connect with jogbox 10 using a standard connector (e.g. a 44-pin connector shown in FIGS. 6 and 7) or using a specialized/custom connector. A bottom side of jogbox 10 may have a shape that enables easy alignment of cable connector 224 with connector receptacle 263 for attachment. Jogbox 10 may include a strain relief element 262 where cable 62 detachably couples with jogbox 10. By providing a removable cable, not only may jogbox 10 be used as an unattached unit in wireless mode, cable 62 may be replaced in the event of a cable failure. In many known jogboxes, the cable and the jogbox are permanently connected and failure of the cable or cable connection often results in replacement of both the jogbox and the cable.

Jogbox 10 may be configured solely for wired use, configured for wireless and wired use, configured solely for wireless use, and/or may be wireless ready, meaning that the jogbox is currently configured for wired use, but is configured to accept a wireless transceiver module 230, in accordance with aspects of the invention. Jogbox 10 as depicted in FIGS. 6 and 7 is in a wired configuration and is configured to accept a wireless transceiver module 230.

Jogbox 10 may include an internal power source for wireless communication. FIG. 7 depicts a bottom plan view of jogbox 10 showing a cover 220 over a compartment 222. Handgrips 210a and 210b may be part of cover 220. Although an internal power source may not be required when jogbox 10 is in a wired configuration, compartment 222 may be used to house batteries when jogbox 10 is configured for wireless communication (see also FIG. 8). Handgrips 210a and 210b may be part of cover 20 over compartment 222.

Many different protocols and technologies may be employed for wireless communication between jogbox 10 and other devices, such as a coordinate measuring machine controller and/or a computer configured to execute a metrology application. Jogbox 10 may employ different technologies and/or different communication protocols to wirelessly communicate with different devices. Examples of communication protocols include Bluetooth®, WiFi®, Zigbee®, Firewire®, etc. Wireless communication may be in one or more frequency bands that may be low frequency bands, high frequency bands, radio bands, licensed bands, unlicensed bands, etc. In some embodiments, jogbox 10 may simultaneously communicate with one device using a wired connection and with another device using a wireless connection. In still other embodiments, jogbox 10 may only communicate with other devices wirelessly.

In some embodiments, jogbox 10 may be configured to communicate with a computer and/or a coordinate measuring machine controller computer wirelessly using an internal wireless communication unit, such as a wireless unit based on Bluetooth® technology. An internal wireless communication unit may be included in the jogbox at the time of manufacture, or a suitable receptacle may be included to allow for the optional addition of an internal wireless communication unit by a user at a later time.

Jogbox 10 may be configured to wirelessly communicate with coordinate measuring machine controller 24 and/or computer 28 using a wireless transceiver module 230 that may be attached to or otherwise installed on jogbox 10 by a user. To configure jogbox 10 for wireless communication as shown in the side view of FIG. 8, cable 62 is disconnected from jogbox 10 and wireless transceiver module 230 is attached. Cable connector 224 may be detached from connector receptacle 263 of jogbox 10 as indicated by arrow 225 in FIGS. 6 and 7. In some embodiments, frictional elements 203a and 203b may be detached from distal supports 202a and 202b to enable access to mounting holes 204a and 204b. Wireless transceiver module 230 is then attached to a distal portion of jogbox 10.

Wireless transceiver module 230 may connect with connector receptacle 263 as shown. Wireless transceiver module 230 includes one or more RF transmitters/transceivers 232, or other suitable transmitters/transceivers. The transceivers may be positioned in a distal portion of jogbox 10 and face outwardly so that transmissions are directed toward coordinate measuring machine controller 24. Of course, any suitable placement and arrangement of RF transceivers, receivers, and/or transmitters may be used.

Power may be provided to wireless transceiver module 230 by batteries in jogbox 10 and/or wireless transceiver module 230. As described above, wireless mode on/off button 47 may be provided for activation and deactivation the wireless mode of jogbox 10, thereby enabling a user to conserve battery power when wireless communication is not required. In some embodiments, the batteries may be installed in compartment 222 beneath cover 220 (see FIGS. 6 and 7). In some embodiments cover 220 may be removed and replaced by a cover assembly 223 that may include batteries, over current/voltage circuits, and/or charging circuits.

In some embodiments, cover assembly 223 may be designed to be removable from jogbox 10 for recharging the batteries. In some embodiments, a configuration of jogbox 10 and/or wireless transceiver module 230 enables recharging of the batteries with cover assembly 223 and wireless transceiver module 230 still attached to jogbox 10, such as by detachably connecting jogbox 10 to a power source. For example, wireless transceiver module 230 may include a power receptacle 234 for detachably connecting with a power source (e.g. a jack that receives a standard 12 VDC power supply). Jogbox 10 may receive power through receptacle 234 while communicating wirelessly with controller 24 and/or the dimensional metrology application on computer 28.

Figure 9A:
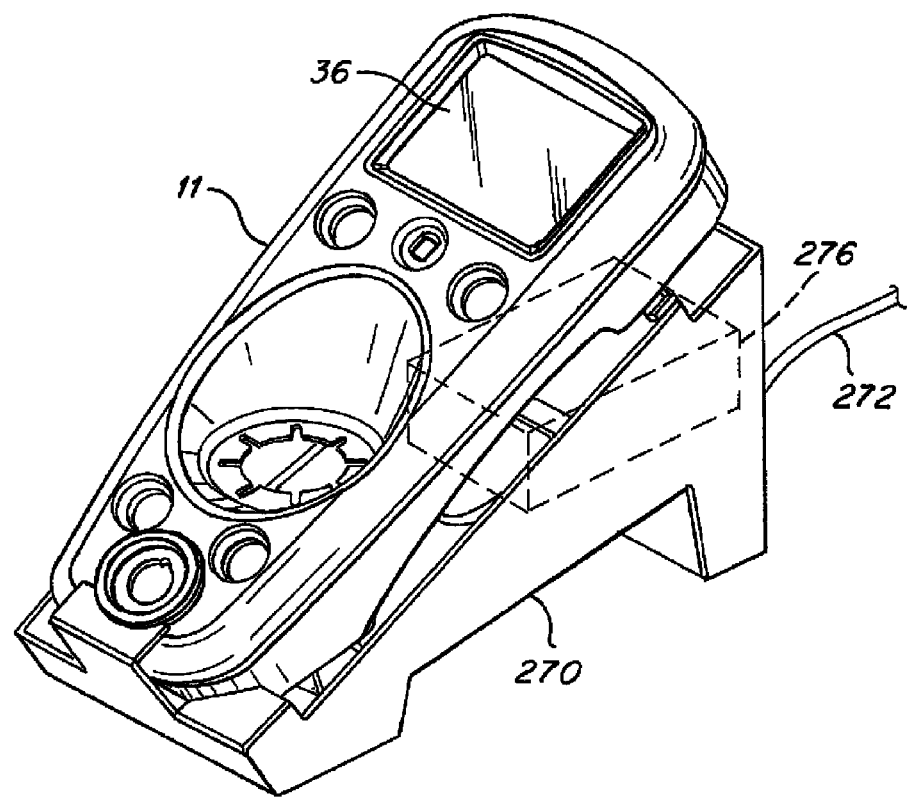
FIG. 9A is a perspective view of a frame of the jogbox engaged in a docking station, according to one embodiment of the invention.
Figure 9B:
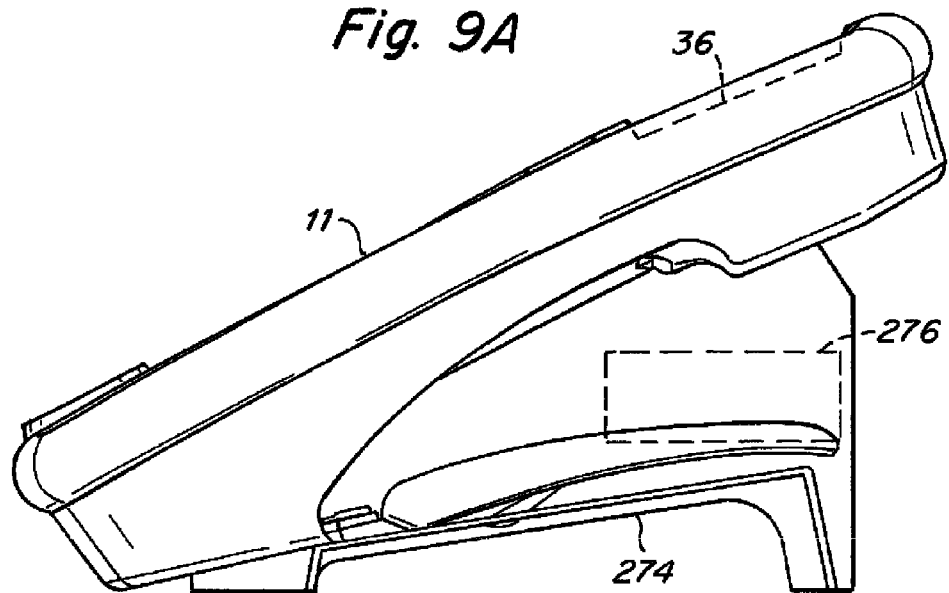
FIG. 9B is a side view of the frame of the jogbox engaged in a different docking station, according to another embodiment of the invention.

As another example, batteries may be recharged when jogbox 10 is connected with a docking station. Jogbox 10 may include one or more power receptacles 227a, 227b that engage a docking station. FIG. 9A depicts a perspective view of a frame 11 of a jogbox engaging a docking station 270, in accordance with an embodiment of the invention. Components of the jogbox other than frame 11 are omitted from FIGS. 9A and 9B for illustrative purposes. Docking station 270 may have a wired connection to a power source 272 or may include its own internal power source. FIG. 9B depicts a side view of jogbox frame 11 engaging a docking station 274 which has a different physical configuration than docking station 270. Docking stations 270 and 274 provide power to jogbox 10 and recharge one or more batteries of jogbox 10. Docking stations 270 and 274 also may include one or more compartments 276 for charging additional batteries. Docking stations 270 and 274 also may orient jogbox 10 with display screen 36 angled toward a user for easier viewing.

Figure 10A:
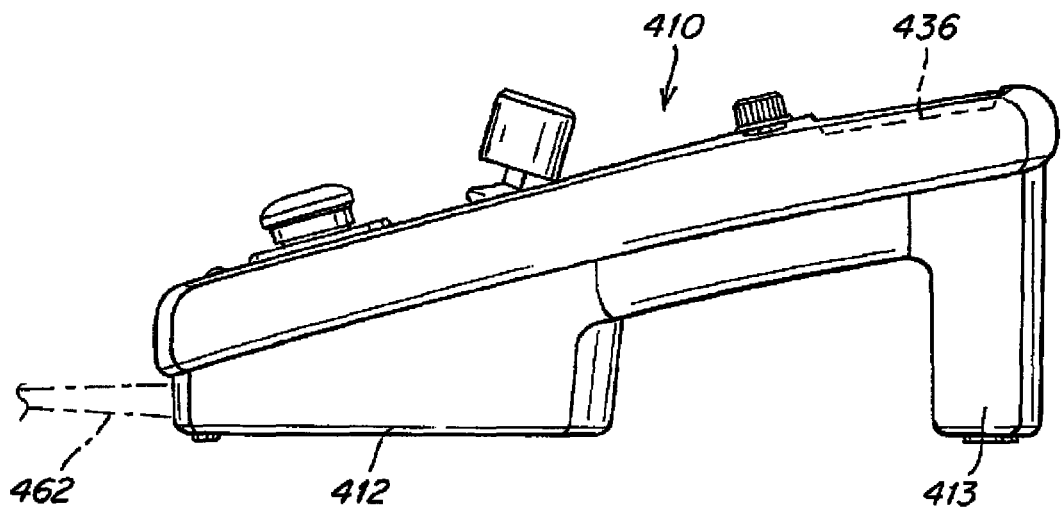
FIG. 10A is a side view of a jogbox, according to another embodiment of the invention.
Figure 10B:
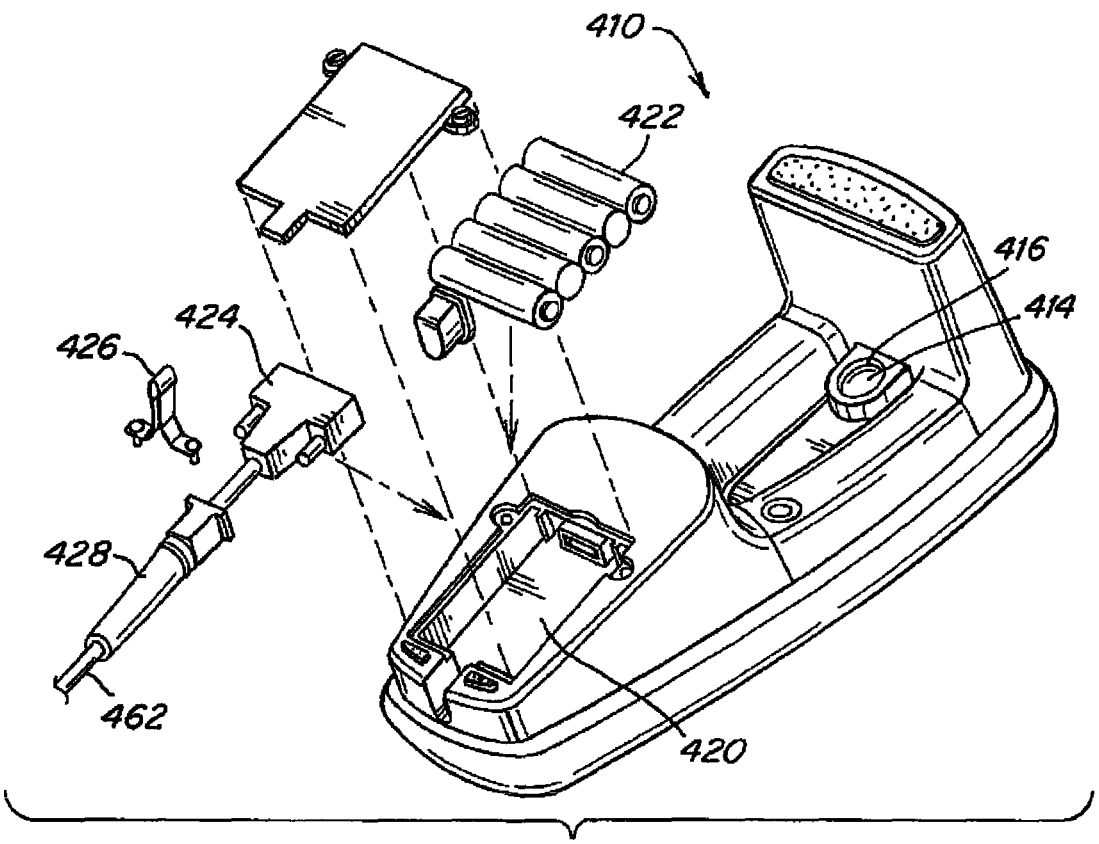
FIG. 10B is a bottom perspective view of the jogbox depicted in FIG. 10A.

FIGS. 10A and 10B illustrate a jogbox 410 with a structural configuration, in accordance with another embodiment of the invention. Jogbox 410 includes a relatively taller distal support 413 than that of jogbox 10 depicted in previous figures. The side view of FIG. 10A shows how proximal support 412 and distal support 413 orient jogbox 410 when jogbox 410 is placed on a flat, level surface. In this embodiment, jogbox 410 is situated at an angle such that display screen 436 faces toward a user standing on the proximal side of the jogbox when jogbox 10 is placed on a flat surface. In some embodiments, display screen 436 may be angled upwardly relative to the more proximal regions of the jogbox.

Jogbox 410 is configured to communicate with a coordinate measuring machine controller and/or computer using a cable and/or a wireless connection. Distal support 413 may house an internal wireless communication unit. The proximal end of jogbox 410 may be configured to connect with a cable 462 as shown in both FIG. 10A and the bottom exploded view of FIG. 10B.

Compartment 420 may function as a housing for one or more batteries 422, a connector 424 and a cable strain relief element 426 when jogbox 410 is in tethered mode. The cable 462 (or other cables described herein) may be fitted with a bend radius control element 428 to reduce cable failure at the entrance to the jogbox. An on/off button 414 for activating and deactivating the jogbox in wireless mode is provided on an underside of jogbox 10 in a recess 416 to reduce the possibility of accidental selection.

Jogbox 10 may be controlled in some embodiments with firmware that is executable on a microcontroller or a microprocessor which resides in the jogbox. The firmware may have an architecture which permits flexibility regarding operations with different types of coordinate measuring machines and/or regarding customizing functions and interface elements. One example of a firmware architecture is described below, however, any suitable firmware architecture may be used, and in some embodiments, no firmware is used as part of controlling the jogbox.

Figure 11:
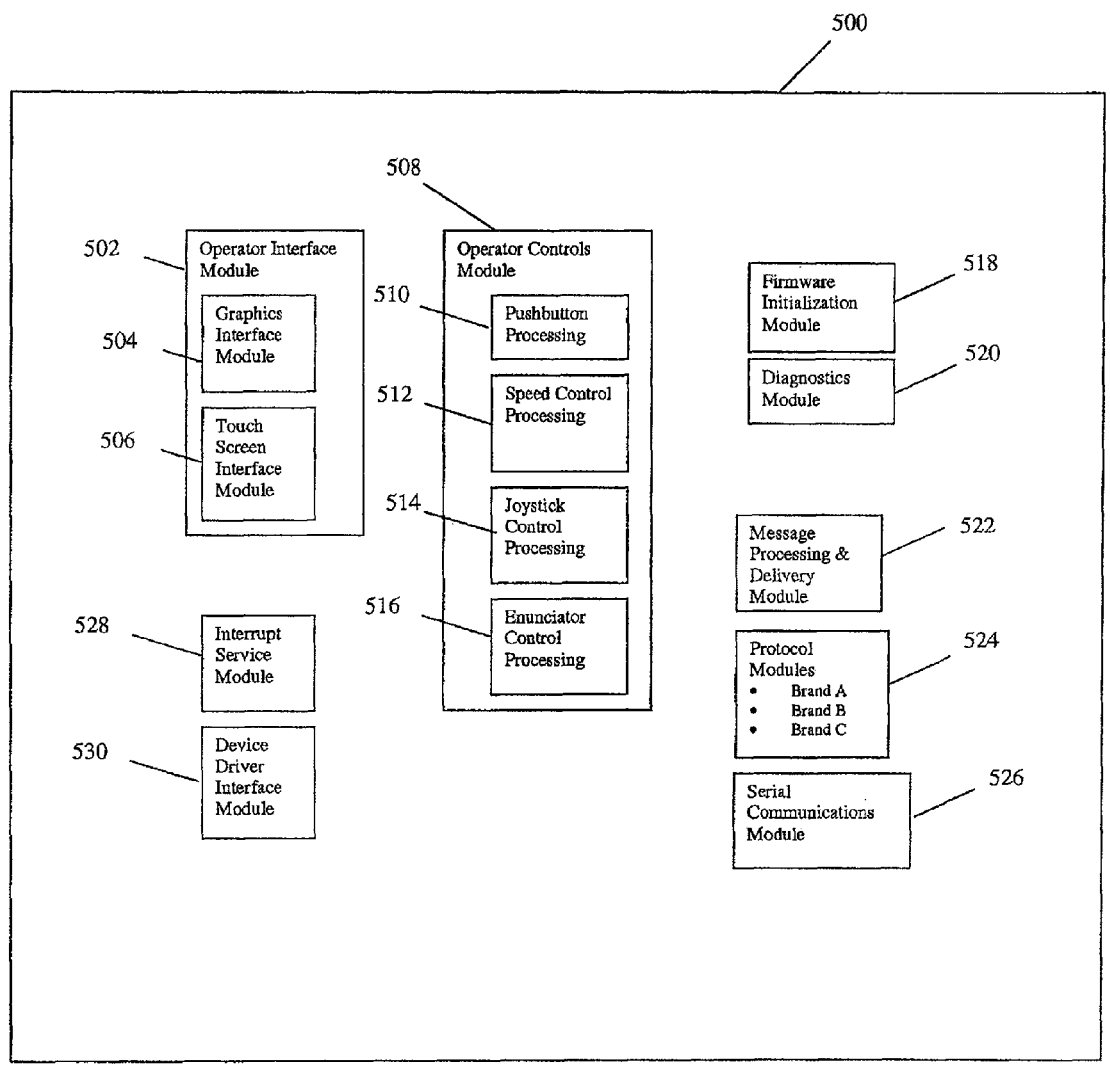
FIG. 11 illustrates one embodiment of firmware architecture, which may be used to control and manage a jogbox.

The firmware may include a firmware core and also include a plurality of modules, some of which provide common interfaces to the components of the firmware core. One example of a firmware architecture 500 including a plurality of modules is shown in FIG. 11. These modules may be developed using a macro assembler or a high-level compiler that is compatible with the chosen microcontroller and peripherals of the jogbox. The firmware executable may execute on a microcontroller or microprocessor capable of servicing (1) multiple serial communications devices; (2) a graphics display device; (3) multiple or multiplexed analog-to-digital devices; (3) attached I/O devices; (4) mode hardware setting devices; and (5) an enunciator device. Special function pushbutton devices (e.g. Start, Stop, and Enable) that are normally directly connected to the machine controller, may have provisions in the jogbox firmware, but do not necessarily need to be serviced by the jogbox firmware.

An operator interface module 502 includes a graphics interface module 504 and a touch screen interface module 506. Graphics interface module 504 includes basic functions to render graphics on a display device such as a display screen. New functions can be supported if desired.

Touch screen interface module 506 informs the firmware core of the x, y position on the display screen that has been pressed, released, or otherwise selected. The firmware core evaluates the touch position to determine whether a button has been pressed or released, and invokes an appropriate action in response.

An operator controls module 508 manages interactions with the hardware of the jogbox. For operator inputs such as physical buttons 44a, 44b, speed control knob 50 and joystick 32, a respective module (i.e., a pushbutton processing module 510, a speed control processing module 512 and a joystick control processing module 514) sets internal state variables, and the firmware is configured to handle communication of signals to the coordinate measuring machine controller. Additional hardware control processing modules can be added to process additional hardware controls.

An enunciator control processing module 516 controls feedback devices such as a speaker or a beeper, and may include volume control.

A firmware initialization module 518 executes code to reinitialize data and hardware devices to bring the jogbox to a known initial state at power-up and when commanded. A diagnostics module 520 includes code which executes at power-up to indicate malfunctioning hardware conditions.

A set of protocol modules 524 handles configuring the jogbox and managing communications with the coordinate measuring machine controller based on the type (e.g., brand) of coordinate measuring machine being used with the jogbox. For example, for each of three coordinate measuring machines (Brand A, Brand B, Brand C), a separate protocol module may implement a unique set of hardware control actions, and may display unique pages of graphics on the display screen (e.g., virtual interface elements and background graphics). The protocol module may cooperate with a message processing and delivery module 522 and a serial communication module 526 to implement suitable I/O interfaces based on the type of coordinate measuring machine, and also based on whether the jogbox is being used in a wireless or a cable mode.

An interrupt service module 528 manages interrupts such as input interrupts, output interrupts and timer interrupts. A device driver interface module 530 is closely related to the specific hardware devices and is written to provide modular access for initialization, diagnostic, interrupt, and background code processes.

It should be appreciated that the invention is not limited to executing on any particular system or group of systems. Also, it should be appreciated that embodiments of the invention are not limited to any particular distributed architecture, network, or communication protocol, unless specifically recited in the claims.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. The implementation details are provided by way of example only, and the invention is not limited to any particular implementation. In some embodiments, firmware, software and/or hardware may be included on a circuit board 264 as shown in FIG. 6.

Various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine. In some embodiments, Linux may be used as an operating system for executing the various programs.

Methods described herein, acts thereof and various embodiments and variations of these methods and acts, individually or in combination, may be defined by computer-readable messages tangibly embodied on or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Computer-readable messages embodied on one or more computer-readable media may define instructions, for example, as part of one or more programs that, as a result of being executed by a computer, instruct the computer to perform one or more of the functions described herein, and/or various embodiments, variations and combinations thereof. The computer-readable media on which such instructions are embodied may reside on one or more of the components of any of systems described herein, may be distributed across one or more of such components, and may be in transition therebetween. Various aspects of the invention may be implemented in a non-programmed environment (e.g., documents created in HTML, XML or other format that renders aspects of a graphical-user interface (GUI) or perform other functions when viewed in a window of a browser program). Various aspects of the invention may be implemented as programmed or non-programmed elements, or any combination thereof.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

The computer-readable media may be transportable such that the instructions stored thereon can be loaded onto any suitable computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Various embodiments according to the invention may be implemented on one or more computer systems. For example, various aspects of the invention may be implemented as specialized software executing in a general-purpose computer system. The computer system may include a processor connected to one or more memory devices, such as a disk drive, memory, or other device for storing data. Memory is typically used for storing programs and data during operation of the computer system. Components of the computer system may be coupled by an interconnection mechanism, which may include one or more busses (e.g., between components that are integrated within a same machine) and/or a network (e.g., between components that reside on separate discrete machines). The interconnection mechanism enables communications (e.g., data, instructions) to be exchanged between system components. The computer system also may include one or more input devices, for example, a keyboard, mouse, trackball, microphone, touch screen, or digitizing tablet and one or more output devices, for example, a printing device, display screen, speaker. In addition, the computer system may contain one or more interfaces that connect the computer system to a communication network (in addition or as an alternative to the interconnection mechanism).

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a PDA, a smart phone or any other suitable portable or fixed electronic device.

Having now described some embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. Aspects of the present disclosure may be implemented with other types of devices including machine tools, assembly machines or optical inspection devices. The foregoing description and drawings are by way of example only. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. The use of "including," "comprising," or "having," "containing," "involving," and variations thereof herein, is meant to encompass the items listed thereafter and equivalents thereof as well as additional items.

What is claimed is:

1. A jogbox for a coordinate measuring machine, the jogbox comprising:
   a first transmission element configured to send signals to a coordinate measuring machine controller associated with the coordinate measuring machine;
   a display configured to display a plurality of virtual interface elements, each of the virtual interface input elements being associated with a functionality;
   one or more processors configured to control the display of virtual interface elements on the display and further configured to recognize user selections of the virtual interface elements, the one or more processors also being configured to select the signals to send to the controller based on the user selections of the virtual interface elements; and
   a second transmission element configured to send signals from the jogbox to a computer, separate from the jogbox, the computer being configured to execute a dimensional metrology application, the dimensional metrology application being configured to act in response to the signals sent by the second transmission element;

a processor configured to receive an indication of an identifying characteristic of the coordinate measuring machine; and a plurality of virtual interface elements associated with a plurality of different types of coordinate measuring machines, the virtual interface elements being stored in the jogbox; wherein the processor is configured to select which virtual interface elements from among the plurality of virtual interface elements to display based on the identifying characteristic of the coordinate measuring machine; and wherein the jogbox is hand-holdable and is physically separated from the coordinate measuring machine controller.

2. The jogbox of claim 1, wherein the one or more processors that are configured to select the signals to send to the controller based on the user selections comprise one or more processors configured to send signals indicating the functionality selected by the user.

3. The jogbox of claim 1, further comprising a touch screen overlaid on the display, the touch screen being configured to allow selection of the virtual interface elements by touching the touch screen.

4. The jogbox of claim 1, wherein the first transmission element that is configured to send signals to the controller comprises the second transmission element that is configured to send signals to the computer configured to execute a metrology application.

5. The jogbox of claim 1, wherein the one or more processors are configured to receive instructions from a device external to the jogbox to create a virtual interface element on the display.

6. The jogbox of claim 5, wherein the external device from which the one or more processors are configured to receive instructions comprises the computer which is configured to execute a dimensional metrology application.

7. The jogbox of claim 1, wherein the computer configured to execute a dimensional metrology application is configured to send signals to the coordinate measuring machine controller in response to signals sent from the jogbox.

8. The jogbox of claim 1, wherein the first transmission element comprises a wireless transmitter.

9. The jogbox of claim 1, wherein the jogbox is configured to engage with a wireless communication module that, when engaged with the jogbox, enables the jogbox to wirelessly send signals to one or both of the coordinate measuring machine controller and the computer configured to execute a dimensional metrology application.

10. The jogbox of claim 1,
wherein the processor is further configured to select a communication protocol for communication between the jogbox and the coordinate measuring machine controller based on the identifying characteristic, the communication protocol defining the types of signals to be sent to the coordinate measuring machine controller.

11. The jogbox of claim 10, further comprising a touch screen associated with the display.

12. The jogbox of claim 10, further comprising cabling hardware that senses a sequence of jumpers of pins being attached to the cabling hardware, the pins being in communication with the coordinate measuring machine controller, wherein the identifying characteristic of the coordinate measuring machine comprises the sensed sequence of jumpers.

13. The jogbox of claim 10, wherein the identifying characteristic identifies the brand of coordinate measuring machine.

14. The jogbox of claim 10, wherein the first transmission element is configured to send wireless signals to the coordinate measuring machine controller.

15. The jogbox of claim 1, in combination with the controller and the coordinate measuring machine, the coordinate measuring machine including a contact probe movable responsive to the signals sent by the first transmission element to the coordinate measuring machine controller.

16. The jogbox of claim 1, wherein the jogbox is configured to receive signals from the computer configured to execute a dimensional metrology application, and the received signals cause a virtual interface element to be displayed on the display.

17. The jogbox of claim 1, wherein the jogbox is physically separated from the computer which is configured to execute a dimensional metrology application.

18. The jogbox of claim 1, further comprising a joystick configured to send signals to the coordinate measuring machine controller that result in the movement of a probe of the coordinate measuring machine.

19. A method comprising:
controlling a jogbox to send signals with a first transmission element to a coordinate measuring machine controller associated with a coordinate measuring machine, the jogbox being hand-holdable and physically separated from the coordinate measuring machine controller;

using one or more processors to control a display of a plurality of virtual interface elements on the jogbox, each of the virtual interface elements being associated with a functionality;

using the one or more processors to recognize user selections of the virtual interface elements, and to select the signals to send to the controller based on the user selections of the virtual interface elements;

controlling the jogbox to send signals with a second transmission element to a computer, separate from the jogbox, the computer being configured to execute a dimensional metrology application, the dimensional metrology application being configured to act in response to the signals sent by the second transmission element receiving an indication of an identifying characteristic of the coordinate measuring machine; and using a processor to select a virtual interface element from among a store of virtual interface elements associated with a plurality of different types of coordinate measuring machines based on the identifying characteristic of the coordinate measuring machine, the virtual interface elements being stored in the jogbox.

20. The method of claim 19, further comprising:
receiving instructions from a device external to the jogbox; and
creating a virtual interface element on the display.

21. The method of claim 19, wherein receiving instructions from a device external to the jogbox comprises receiving instructions from the computer which is configured to execute a dimensional metrology application.

22. The method of claim 19, wherein controlling a jogbox to send signals with a second transmission to a computer configured to execute a dimensional metrology application elements comprises controlling a jogbox to send signals wirelessly with the second transmission element.

23. The method of claim 19, further comprising:
receiving an indication of an identifying characteristic of the coordinate measuring machine; and selecting a communication protocol for communication between the jogbox and the coordinate measuring machine controller based on the identifying characteristic, the communication protocol defining the types of signals to be sent to the coordinate measuring machine controller.

24. The method of claim 23, further comprising sensing a sequence of jumpers of pins being attached to cabling hardware on the jogbox, the pins being in communication with the coordinate measuring machine controller, wherein the identifying characteristic of the coordinate measuring machine comprises the sensed sequence of jumpers.

25. The method of claim 19, further comprising selecting a communication protocol for communication between the jogbox and the coordinate measuring machine controller based on the identifying characteristic, the communication protocol defining the types of signals to be sent to the coordinate measuring machine controller.

\* \* \* \* \*